United States Patent [19]

Cantwell

[11] Patent Number: 4,577,248
[45] Date of Patent: Mar. 18, 1986

[54] FLOPPY DISC ROTATIONAL APPARATUS

[76] Inventor: Gill Cantwell, 2434 Purdue Ave., #17, Los Angeles, Calif. 90064

[21] Appl. No.: 462,591

[22] Filed: Jan. 31, 1983

[51] Int. Cl.[4] .............................................. G11B 5/012
[52] U.S. Cl. ......................................... 360/97; 360/99
[58] Field of Search ................................... 360/97–99, 360/133; 369/270

[56] References Cited

U.S. PATENT DOCUMENTS

| | | | |
|---|---|---|---|
| 3,964,101 | 6/1976 | Hino | 360/99 |
| 4,339,778 | 7/1982 | Wise | 360/99 |
| 4,403,319 | 9/1983 | Adamek | 360/99 X |

FOREIGN PATENT DOCUMENTS 150964  9/1981  German Democratic Rep. ... 360/99

OTHER PUBLICATIONS

IBM TDB; vol. 22, No. 1, Jun. 1979, pp. 293–295; Flexible Disk Drive Hav'g Precise Center'g Mech.; K. Rusch et al.
IBM TDB; vol. 19, No. 12, May 1977, pp. 4722–4723; Hub Assembly for Flexible Disk Media, J. Beck, et al.

*Primary Examiner*—A. J. Heinz
*Attorney, Agent, or Firm*—Nilsson, Robbins, Dalgarn, Berliner, Carson & Wurst

[57] ABSTRACT

A spindle and rotor mechanism between which a floppy disc is clamped for rotation to read/write data thereon. The apparatus provides precision centering and gripping of the disc without permanent deformation thereof while maintaining concentricity. The spindle and rotor are each supported upon a spherical bearing each of which is aligned with the axis of rotation of the disc with the spindle bearing disposed in the plane of the floppy disc while it is being rotated.

21 Claims, 5 Drawing Figures

FLOPPY DISC ROTATIONAL APPARATUS

FIELD OF THE INVENTION

This invention relates to apparatus for centering, clamping, and rotating magnetic recording media, and more particularly to an apparatus for centering, clamping and rotating the thin flexible biaxially oriented polyethylene terephthalate discs found in the floppy disc magnetic memories.

DESCRIPTION OF PRIOR ART

In recent years, the low cost, floppy disc drive has been manufactured in great numbers. The vast majority of these drives have been built to accept the simplest and cheapest of recording media formats which includes a thin layer of magnetic material supported on a 0.003 inch thick flexible disc of biaxially oriented polyethylene terephthalate through which a centrally located precision hole has been punched.

It is the function of the spindle apparatus in a floppy disc drive, to enter this central hole, precisely center the disc relative to the axis of rotation of the spindle, and in some manner impart torque to the disc.

All of this must occur without damaging the fragile disc.

One of the most common designs in the prior art, has been a hollow cup having a shaft supported on a pair of spaced apart ball bearing races into which a multi-fingered molded plastic spindle intrudes and is then expanded by the entrance of a wedge member. In this design two incompatible actions are occurring simultaneously. First the disc is being slid laterally across the cup in the process of being centered. At the same time a clamping force of growing magnitude is being applied to the flat surfaces of the disc as a spring is compressed. Friction from this clamping force interferes with the free and proper centering that should take place. In this design the cup member is the precision part of the assembly, and the multi-fingered and wedge members must be somewhat loosely coupled to permit them to align with the precision cup. As a result, when they enter the cup they are imperfectly aligned, and during the process of clamping the disc, they are under-going changes in concentricity and angularity which are never fully eliminated by the clamping process.

Another problem with this design is the substantial displacement of the first ball bearing support from the disc plane. The further this bearing is from the plane of the disc, the more exaggerated are the effects of eccentricity within the bearing. In this design, the distance from the first ball bearing support to the second ball bearing support is frequently no greater than the distance from the first ball bearing to the disc, and as a result, eccentricity in the second ball bearing is also reflected as eccentricity of the disc.

Another design frequently used is an aluminum alloy spindle again supported on spaced apart ball bearing races with three active surfaces and a second loosely coupled, loosely fitting hub which presses the disc over the spindle, and then clamps the edge. Again the spindle is the precise part of the assembly, and the cup member operates in a very loosely coupled manner. In this design, the spindle must be rotating in order for the disc to be loaded properly onto the spindle. Provisions are made to automatically start the spindle turning if a disc loading operation is detected, however, if no current is being supplied to the drive, this protection is unable to operate, and as a consequence the fragile edges of the disc are damaged by an unsuccessful loading operation completed without the spindle rotating. In this design, the disc is lowered onto a shallow angle conical surface. It is then further forced onto this surface by the loosely fitting hub member until the central hole in the disc has been elastically expanded over a second surface of the spindle which is a cylindrical surface slightly larger in diameter than the largest permissable hole in the data floppy disc. The loosely fitting hub member then clamps the flat surface of the disc against a third surface of the spindle, which is a plane surface. In this design, the spindle is machined from a single piece of aluminum, and as a consequence the junction of the cylindrical surface and the plane surface includes a small, unavoidable radius at the junction between the plane and cylindrical surfaces. This radius prevents the disc from lying fully flat against the plane surface, and instead a small curvature remains in the disc. Since there is no guarantee that this curvature will be equal on all sides, any asymmetry in this curve represents a source of eccentricity.

Also, since the hub member is loose fitting, its final position on the spindle after clamping is somewhat eccentric, and it functions to substantially flatten the disc on one side, while the opposite side remains substantially unconstrained.

In this design, the first ball bearing support can be mounted somewhat closer to the plane of the disc, however substantial offset still exists, and as a result, eccentricity of the upper ball bearing is still exaggerated at the disc plane, and like the previous design, eccentricity of the second ball bearing support is also seen at the plane of the disc.

Although the miniature ball bearings used in these drives are available in precision grades they are rarely used in these low cost drives. Instead the least accurate grade of bearings are generally used and contribute substantially to geometric imprecision within the drive.

The clamping force applied to the flat surfaces of the disc are generally of the order of two or three pounds. As a result, the clearance in the first bearing of these designs is eliminated by this substantial axial preload. In some designs, the second bearing is also preloaded by means of a wave washer, which in turn adds even more preload to the first bearing. In other designs, the second bearing is not preloaded at all, and as a result, the clearance in the bearing can also show up at the disc plane as eccentric free play.

As a result of the substantial axial preloads in these small bearings due to the clamping forces and whatever wave washers are used for additional preloading, substantial additional frictional torque is generated in the bearings. This friction is translated into heat in the bearings which is conducted up the spindle shaft to the spindle and into the disc, where it causes unwanted thermal expansion of the disc. More importantly, torque demands on the drive motor are substantially increased by these friction sources. Efficiency of the small direct current motors used in 5¼ inch floppy drives is in the order of 25% to 50%, so for every watt of kinetic energy the drive motor is required to output, two or three watts of heat are generated in the motor.

SUMMARY OF THE INVENTION

It is an object of the invention, to provide a sequential disc positioning procedure in which the disc is first fully and accurately centered before any clamping occurs, and then the clamping is accomplished without further effecting the centering.

It is a further object, to accomplish disc loading without requiring rotation of the spindle.

It is a further object, to provide fool proof loading without possibility of damaging the fragile edges of the disc.

It is a further object, that after loading the central hole in the data disc should be substantially concentric with the axis of rotation.

It is a further object, that the cylindrical positioning surface of the spindle should be substantially concentric with the axis of rotation.

It is a further object, that the intersections of the cylindrical positioning surface of the spindle, and the flat clamping surfaces, be totally free from fillets which distort and deflect the data disc.

It is a further object, that the spindle apparatus be fabricated from a minimum number of low cost, stamped, molded, and sintered parts.

It is a further object, that rotational friction of the spindle apparatus be minimized, to minimize torque demands on the motor, and to minimize amplitude of flutter.

It is a further object, that polar inertia of the spindle assembly be minimized to permit quick start ups.

It is a further object, to minimize the mass of the spindle assembly, in order to minimize loading on the bearings.

It is a further object, to generate clamping forces within the spindle assembly in order to minimize loading on the bearings and stress in the surrounding structure.

It is a further object, to avoid narrow gaps and clearances in the structure which can close due to stress induced creep causing functional failures.

It is a further object, to provide circulation of outside air through the drive to minimize internal departure from external ambient levels of temperature and humidity.

The present invention includes a positioning and driving apparatus for a floppy disc which includes a spindle and a rotor mechanism with the spindle being urged toward the rotor mechanism to clamp the disc and drive the same. The spindle has four active external surfaces, the first of which is a truncated cone designed to easily be received within the opening in the disc, the second is a cylindrical surface having a diameter slightly greater than the opening in the disc, the third is a transitioning between the first and the second while the fourth is a plane surface extending radially outwardly from and at 90° to the cylindrical surface. In accordance with a further aspect of the invention, the driving apparatus is supported upon a bearing means which is disposed in the plane of the rotating disc.

BRIEF DESCRIPTION OF THE DRAWINGS

FIG. 2 is a view similar to that of FIG. 1 but with the spindle and rotor together and a floppy disc positioned there between;

DETAILED DESCRIPTION OF THE DISCLOSURE

Utilizing the structure constructed in accordance with the present invention the user may place a floppy disc within the disc drive mechanism and activate the drive by closing a handle mechanism appearing thereon to thus lower the spindle into contact with the opening in the disc causing the disc to automatically and finally center in relation to the rotor with a minimum amount of force being exerted thereon to permit positive drive of the disc but without undue wear and tear or deformation thereof.

Figure 1:
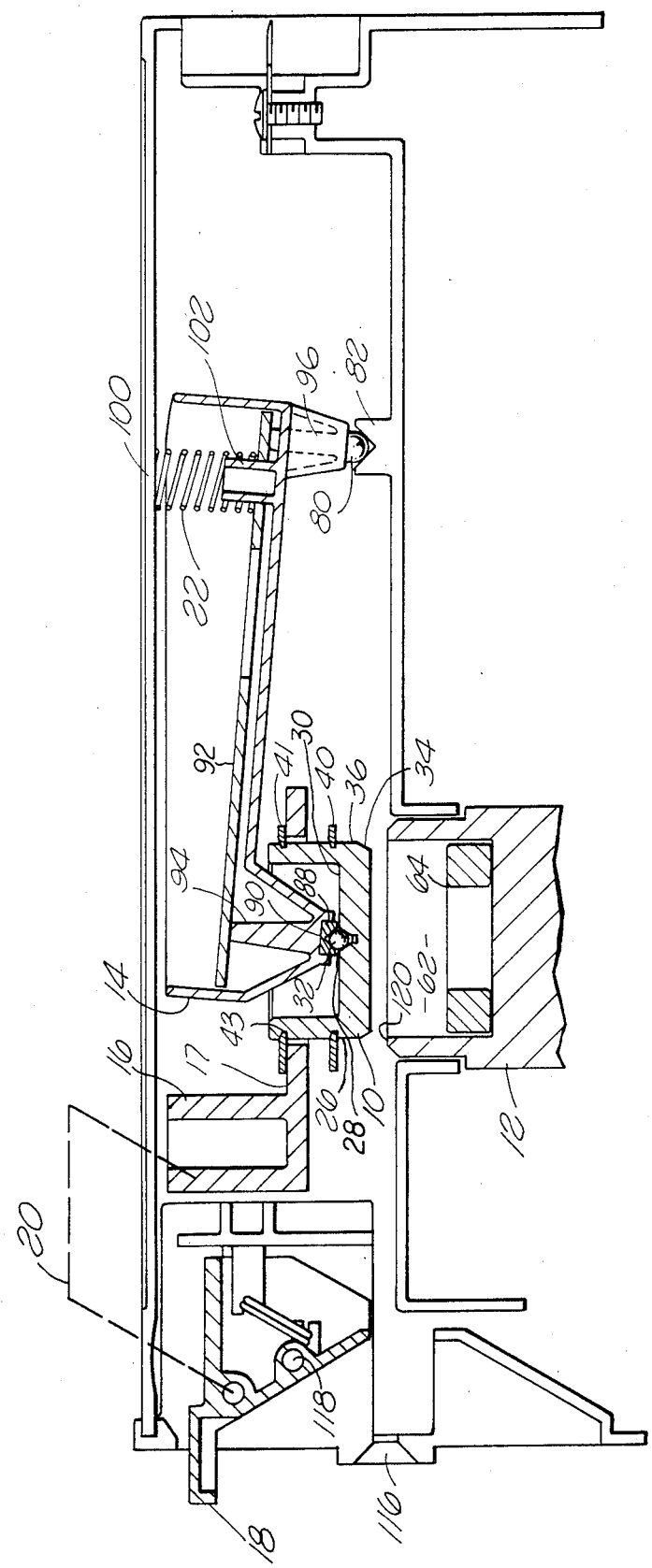
FIG. 1 is a cross sectional view in elevation of apparatus constructed in accordance with the present invention with the spindle separated from the rotor.
Figure 2:
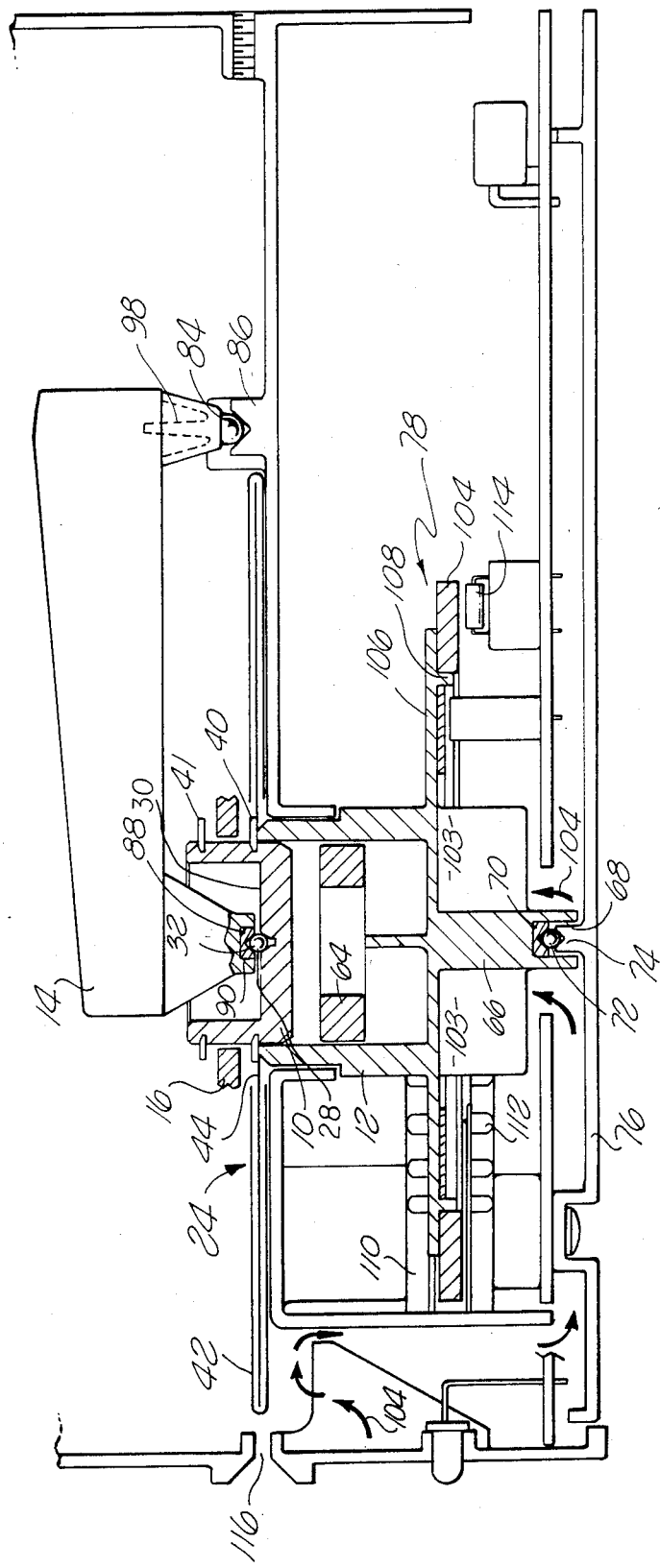
Figure 3:
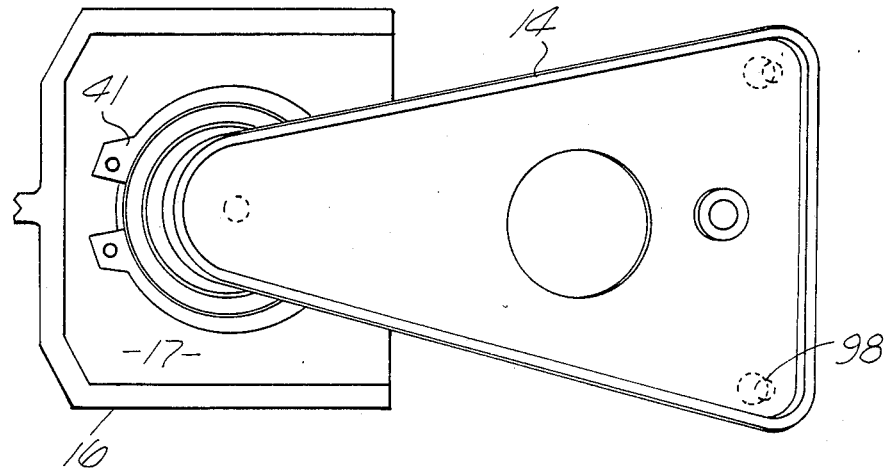
FIG. 3 is a top elevational view illustrating the arm carrying the spindle.

As shown generally in FIGS. 1 and 2 a spindle member 10 is positioned to be moved toward and away from a rotor member 12 through the utilization of compensator arm 14 and a lifting arm 16. When the handle 18 is manipulated by the operator, the lifting arm 16, through the mechanical interconnection between the handle 18 and the lifting arm 16, as illustrated by the dash line 20 causes the lifting arm to occupy the position shown in FIG. 1. In this position, the lifting arm 16 has retracted the spindle 10 and raised the arm 14 against the force of the biasing spring 22. When a floppy disc 24 has been inserted into the disc drive and the handle 18 closed by rotating the same counterclockwise as viewed in FIG. 1 the biasing spring 22 carries the arm 14 and the spindle 10 into the position as shown in FIG. 2 thereby clamping the floppy disc between the spindle and the rotor so that it may then be properly rotated for reading or writing data with respect thereto. As will be more fully described below through the utilization of a spindle and rotor disposed as shown in FIGS. 1 and 2, concentricity between the floppy disc and the spindle is maintained and only the required force as needed to hold the floppy disc in place and rotate it are applied to the disc. In this manner and through the present drive, the integrity of the disc is more readily maintained as compared to prior art disc drives.

To obtain and maintain the desired concentricity, the spindle 10 is a cup-shaped, precipitation hardened, stainless steel part which is fabricated on a screw machine from 17-4 pH stainless steel in the annealed condition. It is then hardened and the cylindrical surface 26 is given a light finishing grind while the spindle 10 is rotating on a carbide tooling ball positioned in the conical socket 28 formed in the bottom surface 30. By this fabrication method, the outside diameter of surface 26 can be held within a very close tolerance, for example about 200 microinches, and the eccentricity of this cylindrical surface 26 relative to the conical socket 28 can be held to a minimum, for example within about 50 microinches total indicator reading.

Unlike prior art, where the total eccentricity is the sum of many contributing eccentricities, the eccentricity of the preferred embodiment as illustrated, is the eccentricity of this single highly concentric part.

A spherical bearing 32 formed preferably of corundum, for example ruby or sapphire, is cemented into conical socket 28 and assumes the same position as the carbide tooling ball around which the cylindrical surface 26 was ground. The center of bearing 32 is located in the plane of the data disc 44 when it is being rotated, as shown in FIG. 2. Consequently, the data disc 44 will rotate about this bearing, and inaccuracies and eccentricities in other parts of the system can only cause wobbles of negligible amplitude, they cannot cause eccentricities.

Figure 4:
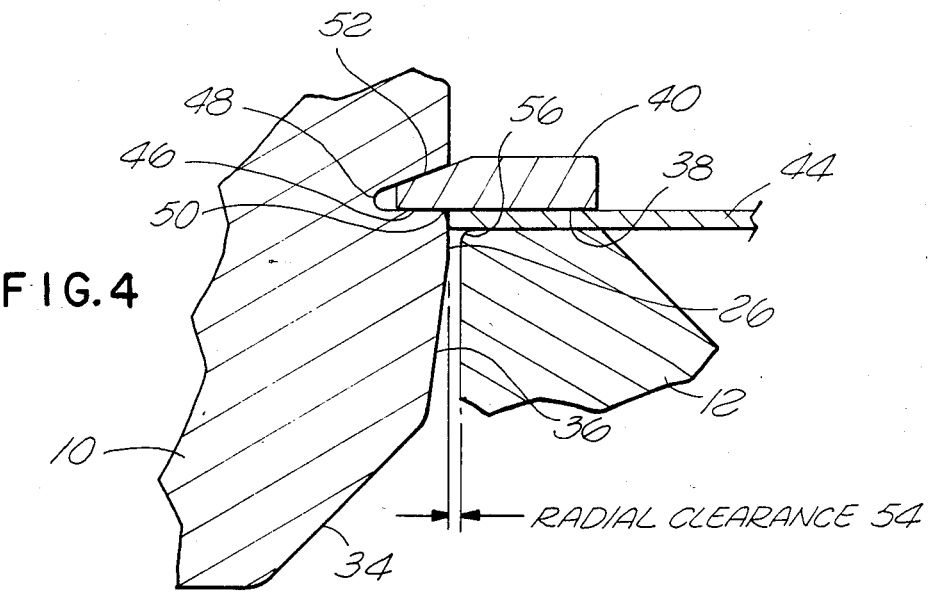
FIGS. 4 and 5 are segmented views illustrating various features of the relationship between the spindle and the rotor in conjunction with the floppy disc.

Unlike prior art which incorporates three working surfaces on the spindle, the preferred embodiment as illustrated incorporates four working surfaces, and it is the addition of this fourth surface which permits the spindle to successfully engage the data disc 44 when the disc is not rotating. FIG. 4 illustrates these surfaces in greater detail. The first surface 34 is a shallow angle, truncated conical surface which loosely guides the hub, the disc, and the rotor into general alignment. The second surface is the precision ground cylindrical surface 26 against which the data disc is referenced during data transfer operations. The third surface 36 is a steeply angled conical surface which transitions between the first and second surfaces and which accomplishes the final alignment and elastically expands the data disc material. The fourth surface 38 is the lower facing plane face of a bevel type retaining ring which serves as the clamping surface when pressed against the data disc 44.

In the prior art, spindle hubs are fabricated from a single piece, and inevitably undesirable fillets and radii appear at the junction of surfaces. As a result the data disc 44 cannot fit squarely into inside corners. Since the data disc 44 is deflected by this fillet, mating members must provide clearance either in the form of a large radius or chamfer, or in substantial radial clearance. This one piece spindle design in the prior art, leads then to an indeterminancy of position of the data disc 44 in the area of greatest concern, and since one portion of the edge of the data disc can be positioned substantially flat while the opposing portion of the edge can be positioned substantially curled, the result is an eccentrically positioned disc.

In the preferred embodiment, as illustrated in FIG. 4, surface 46 of retaining ring groove 48 is formed by a cutting tool on a screw machine. Then after hardening, cylindrical surface 26 is finish machined by grinding and the result is a sharp corner 50. Retaining ring 40 is installed in groove 48 and as a result of beveled surface 52, the retaining ring is pressed tightly against surface 46. This results in a square corner with no fillet to interfere with the data disc, and with a very small radius 50 which is substantially less than the thickness of the data disc 44.

Since the data disc 44 in the preferred embodiment can sit squarely and flatly against the working surfaces of the spindle assembly, the mating rotor can be fabricated with a minimum radial clearance 54 from the spindle 10, and minimum radius 56 at the point of contact with the data disc 44. This sharp cornered and closely fitting rotor 12, ensures that the crucial edge of the data disc 44 does actually lie flat against the retaining ring surface 38, and thus, the concentricity of the data disc 44 approaches the concentricity of the spindle surface 26.

Figure 5:
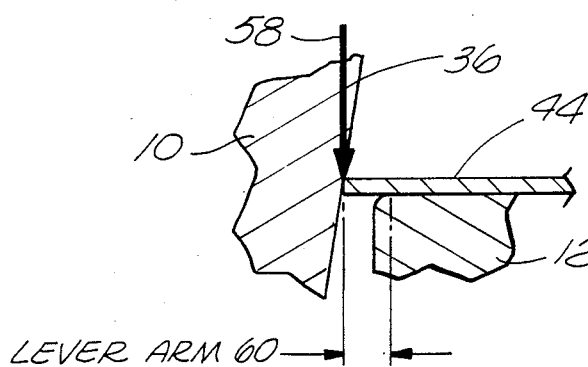

When the steeply angled conical surface 36 begins to elastically expand the central hole in the data disc as illustrated in FIG. 5, an axial force 58 is exerted on the disc which must be opposed by an equal and opposite axial force exerted by the rotor 12. It is a key element of the preferred embodiment that radial clearance 54 is quite small, and therefore flexural stresses generated by force 58 acting over lever arm 60 do not exceed the yield stress of the biaxially oriented polyethylene terephthalate. Therefore, the stiffness of the data disc 44 is sufficient to cause successful centering and insertion and to prevent bending of the edge of the central hole in the data disc 44.

Rotor 12 is fabricated preferably from a graphite and glass filled, polycarbonate injection molding having a recess or opening 62 for receiving the spindle 10. A sintered barium ferrite permanent magnet 64 is cemented in place within the opening 62 in rotor 12. Magnet 64 exerts a magnetic attraction upon spindle 10. This magnetic attraction provides a clamping force between rotor 12 and retaining ring surface 38. This magnetic clamping force grips the data disc 44 frictionally adjacent the opening therethrough and provides sufficient torsional friction to rotate the spindle 10, the data disc 44, and the rotor 12 as a single unit.

As is illustrated, the rotor 12 includes a downwardly positioned shaft 66 having a reentrant bore 68 provided therein. Seated at the bottom of the reentrant bore 68 is a sintered bronze, oil impregnated, conical bearing 70. A second spherical bearing 72, preferably formed of corundum such as sapphire or ruby, is seated within a bearing seat 74 which is also conical in shape and is formed as part of the housing 76 of the disc drive assembly. It should be noted that the spherical bearing 72 is aligned along the axis of rotation of the data disc 44 as is the bearing 32 upon which the spindle 10 rotates. As a consequence, the axial loading on the spherical bearings 32 and 72 need only be sufficient to locate and stabilize the rotating assembly. This light axial load on the bearings results in a small torsional friction load on the spindle drive motor shown generally at 78. It also places only small loads on the surrounding structure, and thus minimizes long term creep in the chassis and other supporting parts.

Compensator arm 14 is also formed preferably from a glass filled, polycarbonate injection molding. Spherical projection 80 engages the conically shaped socket 82 while spherical projection 84 engages the "V" shaped socket 86. A sintered bearing 88 is seated within a depression 90 in the arm 14 and engages the spherical jewel bearing 32. These three points 80, 84 and 88 on the compensator arm 14 are biased against their mating members by a force applied by biasing plate 92 against support posts 94, 96, and 98. Biasing plate 92 is in turn biased by compression spring 22 acting against upper cover 100, and held in place by locating post 102. Biasing plate 92 is preferably an aluminum alloy stamping, and by carrying the force of compression spring 22 to the three support posts 94, 96, and 98, compensator arm 14 is isolated from bending stresses which would otherwise cause long term creep, and a gradual change in the position of the conical socket 88 relative to the spherical projections 80 and 84.

Fan blades 103 are molded as an integral part of rotor 12. By providing a small movement of air as indicated by arrows 104 during movement of the rotor 12 by the motor 78, heat buildup within the disc drive can be controlled. As a result of this forced air movement and the small wattage dissipated within the drive, the temperature and humidity within the drive can be kept substantially the same as the ambient temperature and humidity.

The motor 78 is formed by a ring magnet 104 fabricated preferably from rubber bonded barium ferrite crystals which have been magnetized through the axial direction into 72 angular segments of alternating north and south polarities. The ring magnet 104 is cemented to a radially outwardly extending flange 106 formed as an integral part of the rotor 12. A downwardly extending ring 108 locates the magnet 104 concentrically upon the rotor 12. Appropriate stator plates are disposed at the required positions about the magnet 104 and carry coils for causing rotation of the rotor 12 responsive to electrical signals applied thereto as is well known in the art. Appropriate Hall effect sensors such as shown at 114 are positioned about the magnet 104 to provide the required positional information to switching circuits to provide the required power pulses to the coil assemblies.

As will now be appreciated by those skilled in the art when an operator has placed the handle 18 in the position shown in FIG. 1 the lifting arm 16 is raised in such a manner that the plate 17 engages the retaining ring 41 positioned within the groove 43 on the spindle 10 to thus raise the spindle and the compensating arm 14 to the position shown in FIG. 1. After insertion of the floppy disc assembly consisting of the cover 42 and the data disc 44 into the position shown in FIG. 2 by insertion of the same through the opening 116 in the disc drive housing, the handle 18 may be rotated downwardly, counterclockwise as viewed in FIG. 1 about the pivot 118. This causes the lifting arm 16 to move downwardly as viewed in FIG. 1. As this occurs the surface 34 on the spindle first engages the opening in the data disc 44 and more securely and accurately positions it with respect to the rotor. Thereafter the surface 36 finally positions the data disc 44 properly and as the force exerted by the spring 22 on the biasing plate 92 propels the spindle 10 downwardly into the opening 62 and the rotor 12, the cylindrical surface 26 on the spindle is firmly engaged within the opening in the data disc 44 and the surface 38 subsequently engages the data disc 44 and presses it against the upper surface 120 of the rotor 12. As above-described the magnet 64 then attracts the spindle 10 thus applying sufficient frictional force to the data disc 44 so that it may be properly rotated for the desired read/write operations well known to those skilled in the art.

What is claimed is:

1. Apparatus for positioning and rotating a flexible disc magnetic recording medium having a centrally disposed opening with a diameter therethrough about a predetermined axis of rotation by urging said disc adjacent said opening against a rotor surface, comprising:
   (A) a spindle member having at least for discrete external surfaces for engaging said disc including,
      (1) a first surface defining a truncated cone having a maximum diameter less than the diameter of said opening,
      (2) a second surface defining a cylinder having a diameter slightly greater than the diameter of said opening,
      (3) a third surface transitioning between said first and second surfaces,
      (4) a fourth surface perpendicular to and extending radially outward from said second surface, and
      (5) a groove formed in said second surface for securing a ring therein, said fourth surface being a planar surface defined on said ring;
   (B) bearing means centrally disposed on said axis of rotation;
   (C) means for rotatably mounting said spindle member on said bearing means; and
   (D) means for moving said spindle member toward and away from said rotor surface for gripping said disc between said rotor and fourth surfaces to rotate said disc.

2. Apparatus as defined in claim 1 wherein said mounting means includes an arm having first and second ends, means pivotally mounting said arm at said first end, said spindle member being mounted at said second end.

3. Apparatus as defined in claim 2 which further includes spring means for generating a force continuously urging said spindle member toward said rotor surface.

4. Apparatus as defined in claim 3 which further includes lifting means for applying a force to said arm in excess of the force generated by said spring means to hold said spindle member away from said rotor surface.

5. Apparatus as defined in claim 4 which further includes means for deactivating said lifting means in the presence of a disc to permit said spindle member to engage the opening in said disc to urge said disc against said rotor member.

6. Apparatus as defined in claim 1 wherein said second surface and said ring define a sharp 90 degree angle at their line of intersection.

7. Apparatus as defined in claim 6 wherein said ring is wedge shaped in cross section.

8. Apparatus as defined in claim 1 wherein said bearing means includes at least one bearing disposed substantially in the plane defined by said disc when said disc is being rotated.

9. Apparatus as defined in claim 8 wherein said at least one bearing is a spherical bearing.

10. Apparatus as defined in claim 9 wherein said at least one bearing is formed of a corondum material.

11. Apparatus as defined in claim 9 which further includes a second spherical bearing means defining opposed conical surfaces for mounting said rotor member on said second spherical bearing.

12. Apparatus as defined in claim 11 wherein said second spherical bearing is disposed on said axis of rotation.

13. Apparatus as defined in claim 12 wherein said second spherical bearing is formed of corondum.

14. Apparatus as defined in claim 1 which further includes a rotor member defining said rotor surface, said rotor member defining an opening therein for receiving said second surface on said spindle member, the clearance between said second surface on said spindle member and the surface defining the opening in said rotor member being sufficiently small enough to preclude permanent deformation of said disc adjacent the opening therethrough.

15. Apparatus as defined in claim 14 which further includes permanent magnet means carried by said rotor member for magnetically attracting said spindle member to apply clamping force to said disc.

16. Apparatus as defined in claim 15 wherein said magnet means is secured in the opening defined in said rotor member.

17. Apparatus as defined in claim 14 wherein said rotor member includes air moving members affixed thereto to circulate air through said apparatus to remove heat therefrom.

18. Apparatus as defined in claim 14 wherein said rotor includes an outwardly extending flange member secured thereto and forming a part of a motor for driving said rotor member.

19. Apparatus as defined in claim 18 wherein said flange includes a ring permanent magnet member forming the rotor of said motor.

20. Apparatus as defined in claim 1 wherein said first, second and third surfaces are defined by a unitary cup shaped member having an inside bottom with said second surface being precision formed to be concentric with said axis of rotation.

21. Apparatus as defined in claim 20 wherein said bearing means includes a jewel spherical bearing secured at the inside bottom of said cup shaped member on said axis of rotation.

* * * * *